Aug. 17, 1965    H. I. KEVES ETAL    3,201,175
SALT SLURRY UNLOADING SYSTEM
Filed Nov. 21, 1962    2 Sheets-Sheet 1

INVENTORS.
Henry I. Keves,
Milton J. Rogers.
BY
Harness, Dickey & Pierce
ATTORNEYS.

INVENTORS.
Henry I. Keves,
Milton J. Rogers.
BY
Harness, Dickey & Pierce
ATTORNEYS.

United States Patent Office 3,201,175
Patented Aug. 17, 1965

3,201,175
SALT SLURRY UNLOADING SYSTEM
Henry I. Keves, St. Clair, and Milton J. Rogers, Marysville, Mich., assignors to Diamond Crystal Salt Company, St. Clair, Mich., a corporation of Michigan
Filed Nov. 21, 1962, Ser. No. 239,262
2 Claims. (Cl. 302—14)

The present invention broadly relates to materials handling apparatuses and more particularly to an improved apparatus and method of unloading and conveying particulate solid materials in the form of a slurry employing a carrier liquid for entraining the particulated material being unloaded. A specific embodiment of the present invention is directed to the transportation, unloading, and conveying of sodium chloride salt in a divided solid state from a transport vehicle employing a saturated aqueous sodium chloride solution for forming a slurry or dispersion and transporting the entrained salt to a suitable receiving tank remotely disposed therefrom.

The present invention is applicable for unloading and conveying solid materials either in a granular, pulverant or other finely divided state in which the material possesses free flowing characteristics and is adapted to be entrained in a carrier liquid or a saturated solution of the material forming therewith a slurry which is pumped from a hopper or bin in the transport vehicle to a storage tank at the point of destination. In accordance with this improved apparatus and technique, it is now possible to ship solid particulated materials in dry solid bulk form, dispensing with the necessity and cost of packaging such materials and overcoming the materials handling problems associated with the loading, transportation and unloading of such small packaged quantities. It is now also possible to safely and conveniently handle dry materials which are dusty, explosive, abrasive, friable and the like which could not be satisfactorily handled in mechanical or pneumatic conveying systems of the type heretofore known.

Various unloading systems and apparatuses have heretofore been used or proposed for use for facilitating the handling and unloading of solid particulated materials. For example, various mechanical unloading systems have heretofore been used which have not been completely satisfactory because of the susceptibility of such apparatuses to malfunction necessitating extensive maintenance and prolonged interruptions in unloading operations. In addition, the weight and mechanical complexity of such mechanical unloading systems generally prevent their mounting directly on the transport vehicle which detracts from the optimum utilization of the apparatus. Mechanical type unloading systems are further characterized by the disadvantage of their many moving parts which are particularly susceptible to chemical attack and to deterioration by corrosive materials that substantially reduce their useful operating life and their reliability during unloading operations.

Alternatively, it has heretofore been suggested to employ unloading systems in connection with soluble chemical materials wherein the entire load of material is dissolved and is pumped in the form of a solution from the transport vehicle to a suitable storage tank located at the point of destination. While such a system substantially overcomes the disadvantages of mechanical type unloading systems heretofore known, they possess the inherent disadvantage of requiring relatively extensive storage tank facilities for storing the solution. The large capital expenditure required in providing adequate storage tank facilities is particularly aggravated when chemical compounds of only limited solubility are handled requiring the storage of extremely large quantities of relatively dilute solutions of the material. The time necessary for effecting complete dissolving of the materials is usually excessive which also constitutes a disadvantage of such systems. In many instances where the shipped material is to be used in the dry particulated form, solution unloading systems of this type cannot be employed since the subsequent evaporation or extraction of the water or other solvent from the solution formed constitutes a commercially impractical practice.

It is, accordingly, a primary object of the present invention to provide an improved apparatus and system for unloading bulk quantities of dry solid particulated materials which overcomes the problems and disadvantages of the unloading systems heretofore known.

Another object of the present invention is to provide an improved apparatus and method for unloading bulk quantities of a particulated material from a transport vehicle which provides for a significant simplification and cost reduction in the shipment, handling and storage of bulk quantities of solid particulated materials.

Still another object of the present invention is to provide a transport vehicle, particularly a railway car, possessing self-unloading characteristics and incorporating therein an improved unloading apparatus by which the solid particulated material carried in bulk therein can readily be removed in the form of a slurry and pumped from the unloading platform or railroad sliding to a storage tank located proximate to the point of its intended use.

A further object of the present invention is to provide an improved apparatus for unloading bulk quantities of solid particulated soluble material from transport vehicles and which apparatus can be readily incorporated directly on the vehicle providing optimum utilization of the apparatus and self-unloading characteristics of the vehicle achieving a degree of flexibility and versatility unobtainable with systems heretofore known.

A still further object of the present invention is to provide an improved unloading apparatus which is of simple and durable construction, which is of compact and light weight design, which can be readily incorporated in new or existing transport vehicles such as railway hopper cars, for example, which is simple and economical to operate and control, and which requires minimal maintenance and service.

The foregoing and other objects and advantages of the present invention are achieved by installing conduit means adjacent to the base of a bin or hopper on a transport vehicle from which a carrier liquid is discharged effecting sweeping and entrainment of the lowermost stratum of the finely particulated solid material. The carrier liquid and the entrained solid material is thereafter drained from the base of the bin or hopper and a high velocity stream of carrier liquid is thereafter directed into the drained liquid and entrained solids forming therewith a slurry and imparting a momentum thereto which carries the slurry through a suitable conduit to a receiving receptable. The carrier liquid can be conveniently separated from the entrained solids in the receiving receptacle and thereafter recirculated to the bin or hopper for effecting further entrainment and transport of the material therein. In accordance with this technique, the continuous entrainment and removal of the lowermost stratum of the solid particulated material effects a downward gravitational movement of the bulk quantity of material in the bin or hopper until the entire load has been removed. The carrier liquid can be recirculated for a short period of time at the completion of the unloading operation to assure substantially complete purging of the conduit network of all the entrained solid material unloaded.

Other objects, features, and advantages of the present invention will become apparent from the subsequent description, taken in conjunction with the accompanying drawings, wherein.

Figure 1:
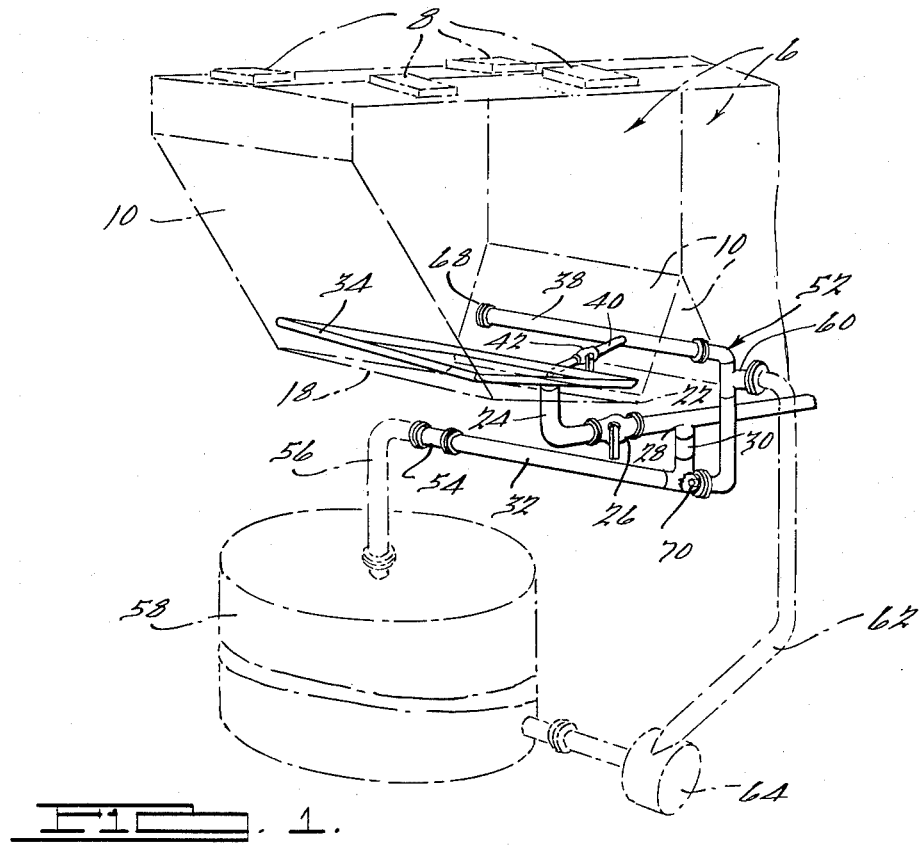
FIGURE 1 is a perspective view partly in phantom which schematically illustrates a preferred embodiment of the unloading system comprising the present invention.
Figure 4:
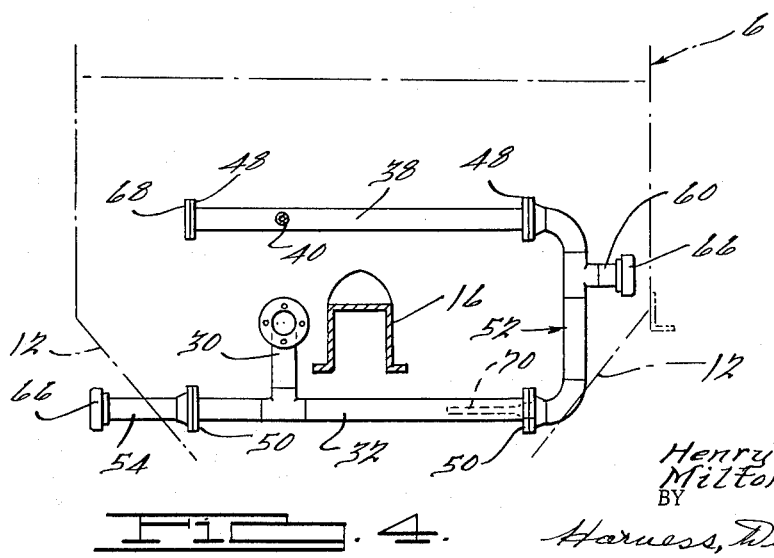
FIG. 4 is a transverse vertical sectional view of the unloading system as shown in FIGURE 3 and taken along the line 4—4 thereof.
Figure 2:
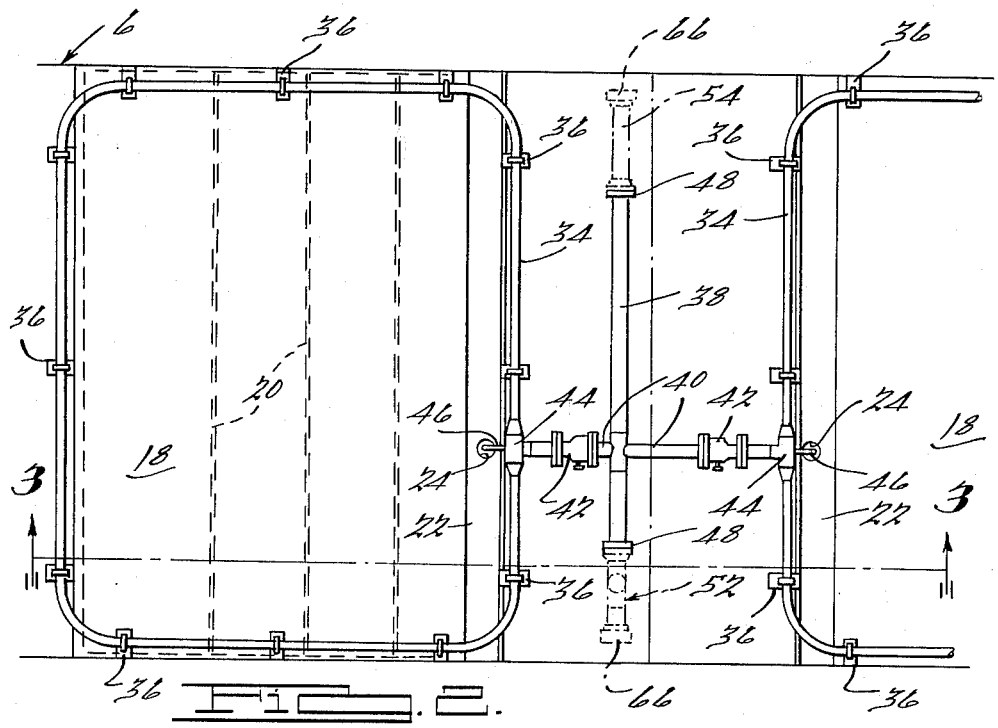
FIG. 2 is a plan view of the liquid feed and drain conduit network installed in a pair of adjacent hoppers of a transport vehicle of the type illustrated in FIGURE 1.
Figure 3:
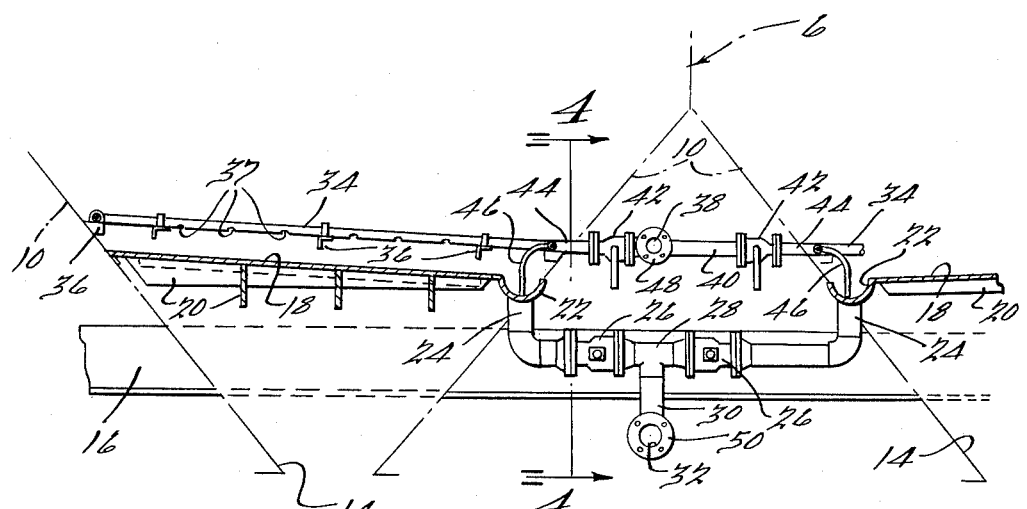
FIG. 3 is a longitudinal vertical sectional view of the unloading system shown in FIGURE 2 and taken along line 3—3 thereof.

Referring now in detail to the drawings, an exemplary arrangement of the self-unloading system is shown installed on a transport vehicle such as a truck or hopper type railway car. In the particular illustration shown, the transport vehicle is formed with a pair of hoppers 6 as shown in phantom in FIGURE 1 provided with a plurality of hatches 8 in the top thereof through which a solid particulated material is loaded at the point of shipment. The lower end walls 10 as shown in FIGURE 3, and the lower side walls 12 as shown in FIGURE 4, are angularly inclined inwardly which normally terminate in a suitable chute 14 in the base of the hoppers. The hoppers are mounted on the bed of the transport vehicle including a longitudinally extending beam 16, which extends for the length of the vehicle.

In adapting a conventional hopper type transport vehicle to the self-unloading system in accordance with the present invention, an angularly inclined base or floor 18 is installed between the end walls 10 and the side walls 12 of each of the hoppers 6, which may be suitably reinforced by ribs 20, as best seen in FIGURE 3, affixed to the underside thereof. The edges of the base 18 are connected in liquid-tight relationship to the end walls 10 and the side walls 12 of the hopper to prevent any leakage of the particulated solid material during transit or the circulating liquid during an unloading operation. In accordance with this installation, the chute 14 conventionally employed for unloading material is rendered inoperative and the hopper extending upwardly from the base 18 constitutes a liquid-tight container.

The base 18 is angularly inclined relative to a horizontal plane and is formed along the lowermost edge portion thereof with a trough 22 of a semicircular cross section which is provided at the lowermost point thereof with a downwardly extending drain conduit 24. The drain conduit 24 from each of the hoppers 6 is disposed between the angularly inclined end walls 10 of adjacent hoppers wherein the connecting conduit network is readily accessible to an operator during an unloading operation.

Each of the drain conduits 24 are connected by suitable flanged shutoff valves 26 to a T fitting 28, which is connected by a vertical leg 30 to a main discharge conduit 32.

Conventionally, the hoppers 6 are loaded with a dry solid particulated material up to a point adjacent to the hatches 8 in the top of the hoppers. During such a loading operation and during transit of the material, the flanged shutoff valves are closed. On reaching the point of destination, the material is unloaded from the hoppers commencing at a point disposed immediately adjacent to the base 18 of the hopper by injecting a plurality of liquid streams from a distributor pipe or sparger 34 mounted within the hopper and disposed adjacent to the base 18 thereof. The distributor pipe 34 as shown in the drawing, extends around the inner end walls 10 and side walls 12 of the hopper and are suitably supported at spaced intervals by clamping brackets 36 affixed to the inner surfaces of the hopper walls. It is an important feature of the present invention that the distributor pipe 34 be located adjacent to the base 18 of the hopper to achieve a continuous downward flow of the particulated material and avoid any bridging or hold-up of the material during an unloading operation. By locating the distributor adjacent and contiguous to the base 18, only the base 18 and the lower stratum of the material are wetted by a stream of the carrier liquid which effects fluidization of the lower stratum of the particles and movement thereof toward the drain responsive to the downward pressure exerted against the fluidized stratum by the overlying dry material.

The distributor pipe 34 is provided with a plurality nozzles or perforations 37 which are effective to discharge a plurality of pressurized streams of a carrier liquid through the lower stratum of the material disposed adjacent to the base 18 of the hopper facilitating the fluidization and entrainment of the material by the liquid and movement thereof across the surface of the base 18 toward the drain trough 22. The positioning of the nozzles 37 is preferably controlled so that the streams of liquid discharged therefrom impart a movement to the particles adjacent the base 18 in a direction toward the drain trough 22 supplementing the draining charcateristics of the fluidized stratum as provided by the downward force exerted by the overlying dry material. In this manner, only relatively small quantities of liquid are necessary to effect entrainment and unloading of the particles.

The pressurized carrier liquid is supplied to each of the distributor pipes 34 from a laterally extending supply header 38 through side branches 40 provided with shutoff valves 42 for controlling the flow of liquid. The side branches 40 are connected to a T fitting 44 in each of the distributor pipes 34 which is provided with a nozzle tube 46 that is directed downwardly and in axial alignment with the drain conduit 24. The discharge of a portion of the pressurized carrier liquid from the nozzle tube 46 into the drain conduit 24 facilitates the drainage of the carrier liquid and entrained solids moving from the trough 22 toward the main discharge conduit 32.

The ends of the supply header 38 are provided with flanges 48 and the ends of the main discharge conduit 32 are provided with flanges 50 to which a branch connector line 52 is removably connected. The arrangement of the flanges 48, 50 enables the branch connector line 52 to be mounted either on the right or left hand side of the transport vehicle enabling unloading of the contents from either side consistent with the particular location of the unloading facilities at the point of destination. To the opposite flange 50 of the main discharge conduit 32, a flanged extension conduit 54 is removably connected which in turn is adapted to be connected with a discharge conduit 56 for transporting the slurry to a storage receptacle 58, as shown in phantom in FIGURE 1.

The branch connector line 52 is provided with an inlet branch 60 which is formed with a mounting flange to which a liquid inlet line 62 as shown in phantom in FIGURE 1, is adapted to be connected during the unloading operation. The supply line 62 in turn is connected to the discharge side of a suitable pump 64 having the suction side thereof connected to the storage receptacle 58 for withdrawing and recirculating the liquid therefrom to the unloading system. The inlet branch 60 and the outlet side of the extension conduit 54 may be suitably closed by caps 66 removably mounted thereon for preventing the entry of extraneous dirt into the conduit network during transit of the transport vehicle. Similarly, the flange 48 opposite to the flange to which the branch connector line 52 is connected, may suitably be provided with a blind flange 68 for sealing the end of the supply header 38.

The lower end of the branch connector line 52 as viewed in FIGURE 4 is formed with an elongated nozzle 70 which extends longitudinally and axially of the main discharge conduit 32 through which a portion of the carrier liquid is discharged in the form of a high velocity stream effecting the formation of a slurry of the liquid and the entrained solid particles transferred down through the vertical leg 30 into the main discharge conduit 32. The high velocity liquid stream discharged from the nozzle 70 also imparts momentum to the suspended or entrained solid particles effecting a sweeping thereof out through the main discharge conduit 32, the extension conduit 54, and the discharge conduit 56 into the storage receptacle or tank 58 disposed remotely therefrom.

The unloading system as hereinbefore described and as illustrated in the drawings is particularly satisfactory for achieving an unloading of solid particulated soluble chemical compounds by employing a carrier liquid which comprises a saturated solution of the material being unloaded. The system has been found exceptionally suitable for unloading salt in the form of granules or rock crystals employing a saturated brine solution as the carrier liquid. By virtue of the introduction of the carrier liquid at a location adjacent to the lowermost stratum of the material in the hopper 10 utilizing a substantially saturated solution of brine, agglomeration or partial solidification of the bulk quantity of the salt in the hopper is eliminated maintaining its downward gravitational flow characteristics whereby the entire load can be simply removed and transferred to a brine tank such as the storage receptacle 58.

The mixture of the saturated brine solution and the solid particulated salt in the brine tank can be consumed by simply adding makeup water to form additional saturated brine solution as the brine solution is consumed. Alternately, the saturated aqueous sodium chloride solution can be removed from the storage receptacle leaving the particulated sodium chloride salt in a crystalline state if a suitable water soluble anti-caking agent of the types well known in the art is introduced into the carrier liquid.

In a typical operating sequence of the unloading apparatus comprising the present invention for use in the transportation and unloading of salt, for example, the material is first loaded in bulk form in the hoppers of the transport vehicle with the shutoff valves 26 and 42 in the closed position. The vehicle when it reaches its destination can simply be unloaded by first removing the caps 66 from the inlet branch 60 and the extension conduit 54 to which a suitable liquid supply line 62 and a discharge conduit 56 respectively, are connected. If only one of the hoppers of a plurality of hoppers is to be emptied or unloaded, only the shutoff valves 26 and 42 for that hopper are opened. The pump 64 is thereafter energized effecting the flow of a pressurized brine solution into the branch connector line 52 from which a portion thereof passes to the distributor pipe 34 and is discharged from the nozzles 37 therearound. At the same time, the brine solution is discharged from the nozzle tube 46 into the drain conduit 24 facilitating the draining of the entrained salt crystals to the main discharge conduit 32. A high velocity jet of the brine solution is also discharged from the nozzle 70 which is effective to sweep the drained brine solution and entrained salt particles from the main discharge conduit 32 out through the extension conduit 54 and discharge conduit 56 to the main receiving tank 58.

As the unloading operation continues, the particulated salt in the hopper moves downwardly toward the base 18 of the hopper to replace the lower stratum of salt which has been removed through the drain conduit 24. The unloading operation continues until all of the salt has been removed from the hopper after which the pump remains energized to continue the circulation of the saturated brine solution for a period of time sufficient to assure substantially complete purging of any residual solid particles in the piping network. The pump is then de-energized and the system is allowed to drain for a period of time to remove substantially all of the brine solution from the piping network. The shutoff valves 26 and 42 are then closed and the supply line 62 and the discharge conduit 56 are disconnected. The protective caps 66 are thereafter reinstalled on the inlet branch 60 and on the outlet flange of the extension conduit 54 and the transport vehicle may then be moved to a different location.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In an apparatus for unloading bulk quantities of a particulated substantially dry solid material from a transport vehicle, the combination including a transportable frame, a receptacle on said frame having the base thereof angularly contoured relative to a horizontal plane, said base formed with a drain outlet disposed in the lowermost region thereof, a drain conduit connected to said drain outlet, a distributor pipe disposed adjacent to said base and formed with a plurality of nozzles therein adapted to discharge a carrier liquid against said base for sweeping and entraining the lowermost stratum of said material toward said drain outlet, one of said nozzles disposed in alignment with said outlet means, a second nozzle in said drain conduit for discharging a high velocity stream of said carrier liquid axially of said drain conduit for sweeping the drained said liquid and entrained said material out of said drain conduit, conduit means connected to said distributor pipe and to said second nozzle, a supply conduit adapted to be removably connected to said conduit means and including pumping means for withdrawing said carrier liquid from a receiving tank and supplying said pressurized carrier fluid to said distributor pipe and said second nozzle, and a discharge pipe adapted to be removably connected to said drain conduit for conveying a slurry of said liquid and the entrained said material to said receiving tank remotely disposed therefrom.

2. In an apparatus for unloading bulk quantities of a particulated substantially dry salt from a transport vehicle, the combination including a transportable frame, a receptacle on said frame having the base thereof angularly contoured relative to a horizontal plane, said base formed with a drain outlet disposed in the lowermost region thereof, a drain conduit connected to said outlet means, a distributor pipe disposed within said receptacle and adjacent to said base and formed with a plurality of nozzles for discharging a pressurized saturated brine solution effecting a sweeping and entrainment of the lowermost stratum of said salt in said receptacle, one of said nozzles disposed in alignment with said outlet means for discharging said brine solution therein, a second nozzle disposed in said drain conduit for discharging a high velocity stream of said brine solution axially of said drain conduit for sweeping the drained said brine solution and the entrained said salt out through the discharge end thereof, conduit means connected to said distributor pipe and said second nozzle, a supply conduit connected to said conduit means and including pumping means for withdrawing said brine solution from a receiving tank and supplying said brine solution to said distributor pipe and said second nozzle, and a discharge pipe adapted to be removably connected to said drain conduit for receiving and conveying a slurry of said brine solution and the entrained said salt to said receiving tank remotely disposed therefrom.

(References on following page)

References Cited by the Examiner

UNITED STATES PATENTS

| | | | |
|---|---|---|---|
| 1,091,251 | 3/14 | Stauffer | 302—14 |
| 1,264,688 | 4/18 | Schilling | 302—14 |
| 1,908,220 | 5/33 | Chapman | 302—14 |
| 2,280,944 | 4/42 | Foresman | 302—15 |
| 2,505,194 | 4/50 | Loss | 214—152 |

SAMUEL F. COLEMAN, *Primary Examiner.*

ANDRES H. NIELSEN, ERNEST A. FALLER, Jr.,
*Examiners.*